United States Patent [19]
Chojnacki

[11] Patent Number: 4,862,554
[45] Date of Patent: Sep. 5, 1989

[54] SAFSTRAP

[76] Inventor: Daniel M. Chojnacki, 412 N. Howard St., Akron, Ohio 44304

[21] Appl. No.: 267,250

[22] Filed: Nov. 4, 1988

[51] Int. Cl.⁴ .............................................. B25G 1/00
[52] U.S. Cl. .............................. 16/126; 16/DIG. 24; 16/114 R; 49/460; 105/354
[58] Field of Search ...................... 16/114 R, 119, 125, 16/126, 127, DIG. 15, DIG. 24, DIG. 25; 49/460; 190/116; 105/354

[56]  References Cited
U.S. PATENT DOCUMENTS

| 733,867 | 7/1903 | Myers | 105/354 |
|---|---|---|---|
| 4,114,234 | 9/1978 | Hogenson | 16/114 R |
| 4,374,188 | 2/1983 | Campbell et al. | 16/125 X |

FOREIGN PATENT DOCUMENTS 7637 of 1913 United Kingdom ................ 705/354

Primary Examiner—Fred A. Silverberg
Attorney, Agent, or Firm—David M. Lowry

[57] ABSTRACT

A lightweight strap with a handle at one end of the strap for grasping and a heavy duty hook snap and "D" ring configuration at the other end. The snap hook to be inserted through a handle or other aperture in a tractor trailer door and snapped to the "D" ring. The length of the strap being sufficient so as to permit an individual to grasp the strap through the handle portion when the tractor trailer door is open and pull upon the strap thereby pulling the door down in a safe and conscientious manner.

1 Claim, 1 Drawing Sheet

SAFSTRAP

BACKGROUND AND SUMMARY OF THE INVENTION

This invention relates to a novel and useful type of strap to be utilized primarily in the trucking or transportation industry. Presently the handle or other means of grasping the trailer door is easily accessible when the door is in the closed position. In the open position, however, the handle is well beyond the grasp of an individual. As such, in the industry, a truck driver or other individual will often times jump up or grasp onto the trailer door handle and swing down to cause closure of the door. This is particularly dangerous due to the fact that injuries can result from individuals swinging from the handle and otherwise jumping up and down in order to grasp the handle. The instant invention makes it particularly easy for an individual to accomplish door closure due to its remarkably easy attachment and characteristic resilience and strength. Specifically, this unique strap is removably affixed to the handle or other aperture on a trailer door. The strap is of sufficient length so as to provide a means wherein an inidvidual may grasp the end of the strap and pull the door closed in a safe and convenient manner. In addition, the Safstrap is manufactured out of readily available in the market place nylon or polypropylene webbing. Modifications and additions to the strap in order to create the instant invention consist of sewing in accordance with the below described invention and the utilization of an "D" ring and a heavy duty metal snap hook.

It is the principal object of the present invention to provide a strap for the attachment and/or affixation to a truck door handle or other aperture to provide for easy closure of the door from the open position in a safe and convenient manner. Due to the size and other design characteristics of the strap, it is readily adaptable to any trailer door in this country and throughout the world. A further review of the invention will indicate that there are numerous other applications and/or objects to be accomplished by the strap, many of which will become obvious to one familiar with the art upon review of the attached specifications and the accompanying drawings comprising this application.

BRIEF DESCRIPTION OF THE DRAWINGS

FIG. No. 1-Is a view of the strap in its preferred embodiment, namely attached to the handle of a trailer door. Note that the door is shown in the open position and the strap in its extended position.

FIG. No. 2-Is a side view as referenced in FIG. No. 1 of the strap attached and/or affixed to the door handle or end of the trailer and snapped so as to provide a continguous member.

Figure 1:
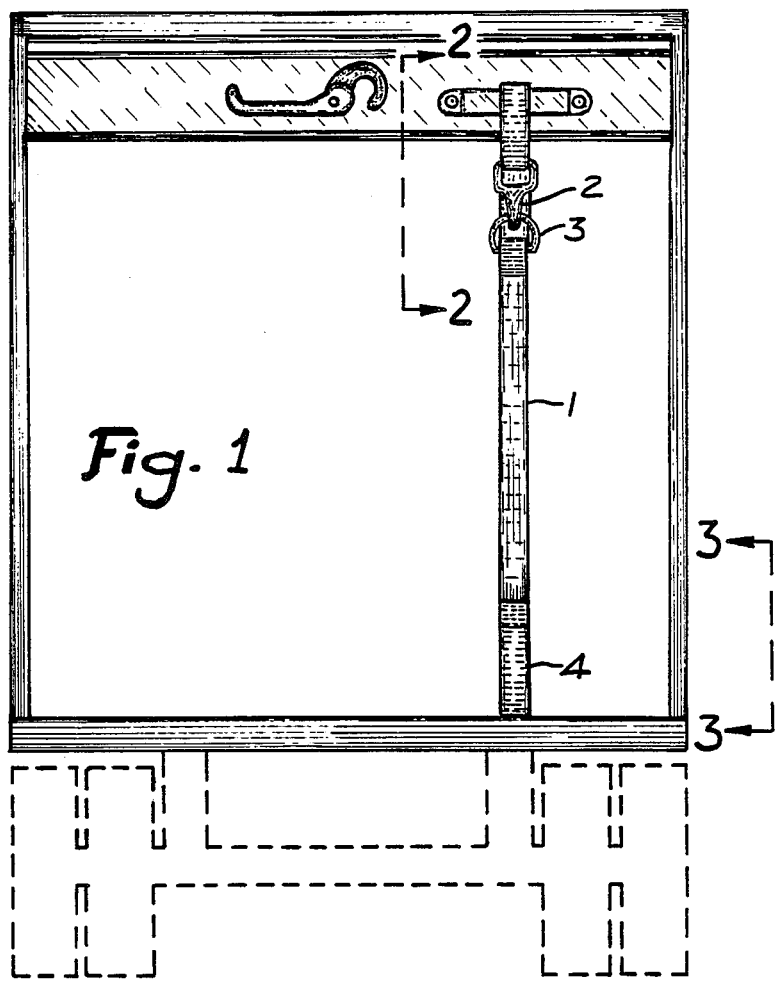
Figure 2:
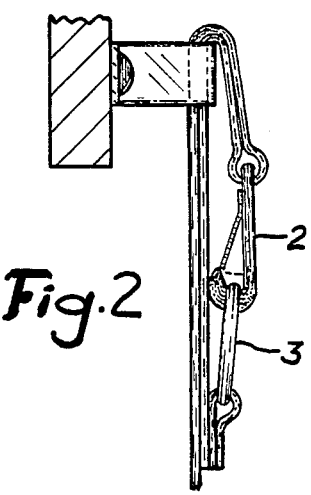
Figure 3:
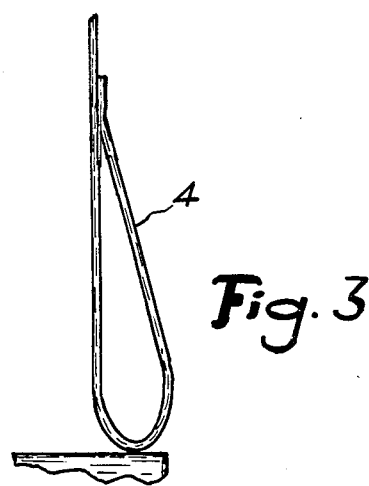

FIG. No. 3-Is a view of the handle portion of the strap as illustrated in the sectional view of FIG. No. 1.

DETAILED DESCRIPTION OF THE INVENTION

In general, the present invention comprises a strap manufactured from nylon and/or polypropylene webbing. Any material significantly similar to the aforementioned should, however, be acceptable provided requisite strength is available to provide adequate utilization. It is important to note that these aforesaid materials have been found to be the most conducive to weather and shrinkage resistance and the various elements encountered in the usuage of the preferred embodiment. In the preferred embodiment, a strap of one and one half inch (1½") width is used. Once again, it is important to note that the width of the strap has been found to be most acceptable at one and one half inches (1½"), but many other widths are certainly acceptable. The main factors dictating the width of strap are a function of essentially two (2) items. First, obviously, the strap needs to be of sufficient width in order to provide the requisite strength to accomplish the capability of pulling down a rather heavy door. Second, the strap must not exceed certain parameters so that it is capable of being affixed to the back of the trailer door. In particular, the strap must fit easily through the door handle or other orifice to which it is affixed. In terms of length, the strap must be of sufficient length so as to enable an individual to pull the strap down without jumping or reaching strenuously to grasp the handle of the strap. This particularly due to the fact that one of the primary functions of the strap is to lessen the likelihood of injury occurring from individuals jumping to grasp a trailer handle or swinging from the trailer handle. As such, in the preferred embodiment, a strap length of approximately seven (7) to eight (8) feet has been found to be sufficient to accomplish the aforesaid goals. At one end of the strap is a handle. This is done rather simply in that the strap material is folded back and sewn onto a portion of the strap so as to create a handle for grasping. Preferably, this is done by folding the end of the strap back approximately ten inches (10") and sewing the end of the strap to an adjacent portion of the strap so as to provide a handle. At the other end of the strap is the closure apparatus. Approximately twelve inches (12") from the end of the strap is sewn or otherwise affixed a modified "D" ring. A heavy duty metal snap hook, readily available in the marketplace, is affixed to the strap by once again turning the strap back through a portion of the snap hook and sewing same to the adjacent strap. The snap hook thereby becoming permanently affixed to the terminal end of the strap. In usage, the snap hook is placed through the handle door or other aperature and snapped through the "D" ring attached adjacent to the snap hook in accordance with the aforegoing. In the open door position, the strap then hangs vertically from the handle. An individual desiring to close the door simply grasps the handle at the end of the strap and pulls the door down. When the door is almost closed the strap is thrown inside the bed of the truck so that is does not dangle or hang behind the truck in its stationary mode or while in transit. When the door is open, the strap then again extends and provides a means wherein closure may be accomplished in a very safe and conscientious manner.

Referring now to the drawings accompanying this application, FIG. No. 1 shows the preferred embodiment of the instant invention. Specifically, strap 1 is looped through the handle of a door shown in the open position and the strap extends to the approximate area of the base of the truck bed for easy grasping by an individual desiring to close the door. A heavy duty snap hook 2 is affixed to the end of the strap and is snapped to "D" ring 3 as shown in the figure. FIG. No. 2 is an enhanced view of the affixing portion of the strap. Specifically, heavy duty hook 2 is shown in the snapped position relative to the "D" ring 3. FIG. No. 3, is an enhanced view of the grasping portion of the strap 4.

Specifically, one can see that the strap 1 is turned back and sewn to a portion of the strap to create a portion 4 through which a hand may be placed in order to pull the strap in a downward position so as to close the door.

Obviously, there are numerous possible variations in the functional construction of the strap for affixation and/or attachment to the trailer handle or other aperture. The exact construction will depend upon the particular circumstance, but the preferred embodiment is shown as illustrated herein. All of the numerous variations are conceivable, imaginable, and obvious to one skilled in the art. Thus the invention hereto is not limited thereto and the modifications and variations obvious to one skilled in the art are incorporated herein without the parting from the scope of the instant invention.

What I claim is:

1. A removable strap assembly in combination with a door having an apertured handle thereon for closing a door comprising: a strap having at a first end a first distal end and a grasping portion of sufficient size to enable an individual to grasp said strap; said strap having at a second end a second distal end, a heavy duty snap hook and "D" ring configuration; said second distal end being folded over itself for approximately twelve inches and sewn together at said second end distal end to provide a loop; said lop being inserted through said handle aperture; said heavy duty snap hook being inserted through the loop; said "D" ring being affixed to said second end distal end; said heavy duty snap hook being removably snapped onto said "D" ring to secure said strap second end to the apertured handle; said first end distal end being folded over itself for approximately ten inches and sewn together at said first end distal end to provide the grasping portion; said strap consisting of nylon or polypropylene; said strap being approximately one and one half inches in width and seven to eight feet in length.

* * * * *